Figure 1:
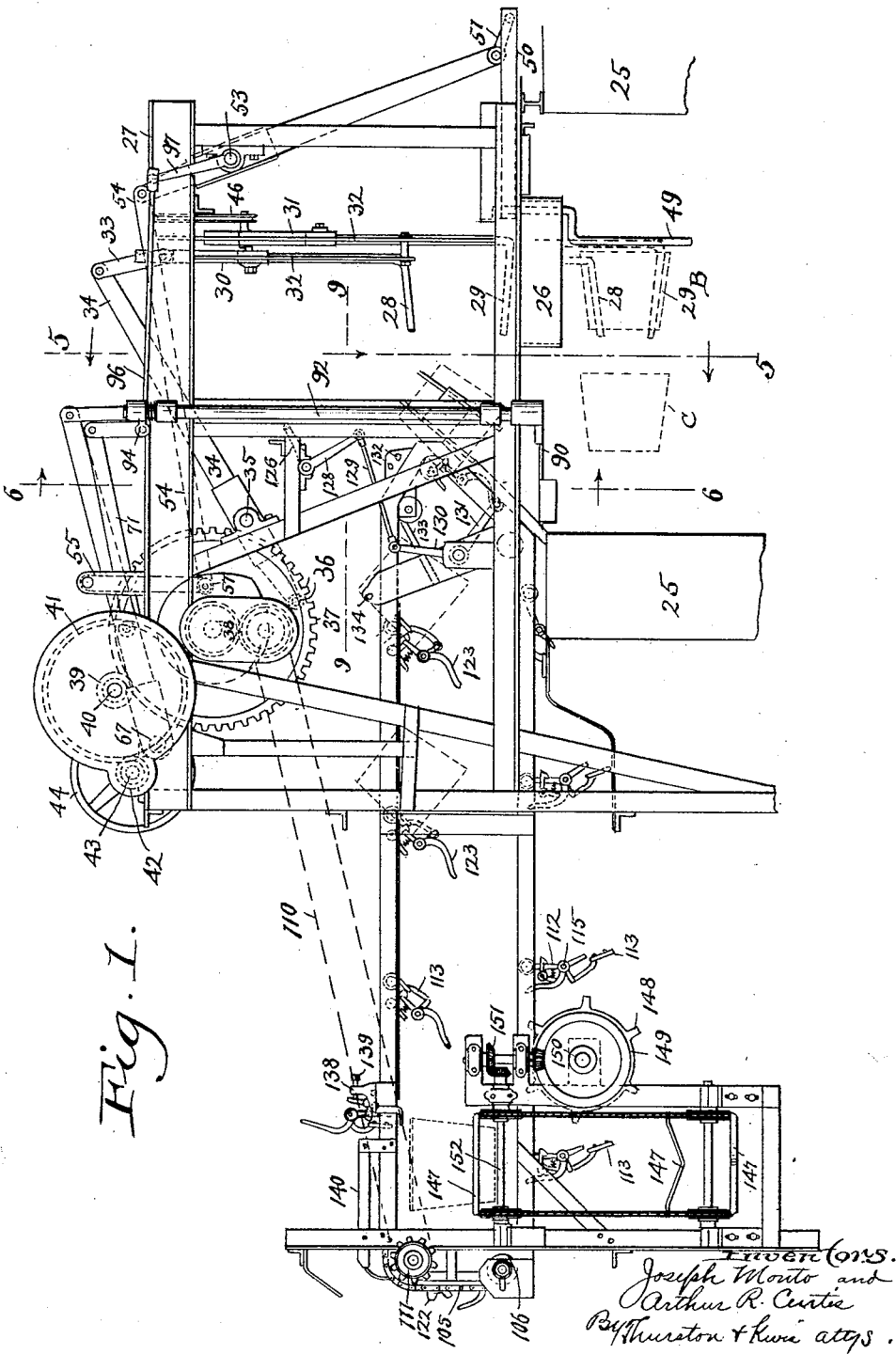

J. MONTO AND A. R. CURTIS.
METAL COATING MACHINE.
APPLICATION FILED SEPT. 26, 1917. RENEWED OCT. 4, 1920.

1,383,555.

Patented July 5, 1921.
13 SHEETS—SHEET 2.

J. MONTO AND A. R. CURTIS.
METAL COATING MACHINE.
APPLICATION FILED SEPT. 26, 1917. RENEWED OCT. 4, 1920.
1,383,555.
Patented July 5, 1921.
13 SHEETS—SHEET 3.
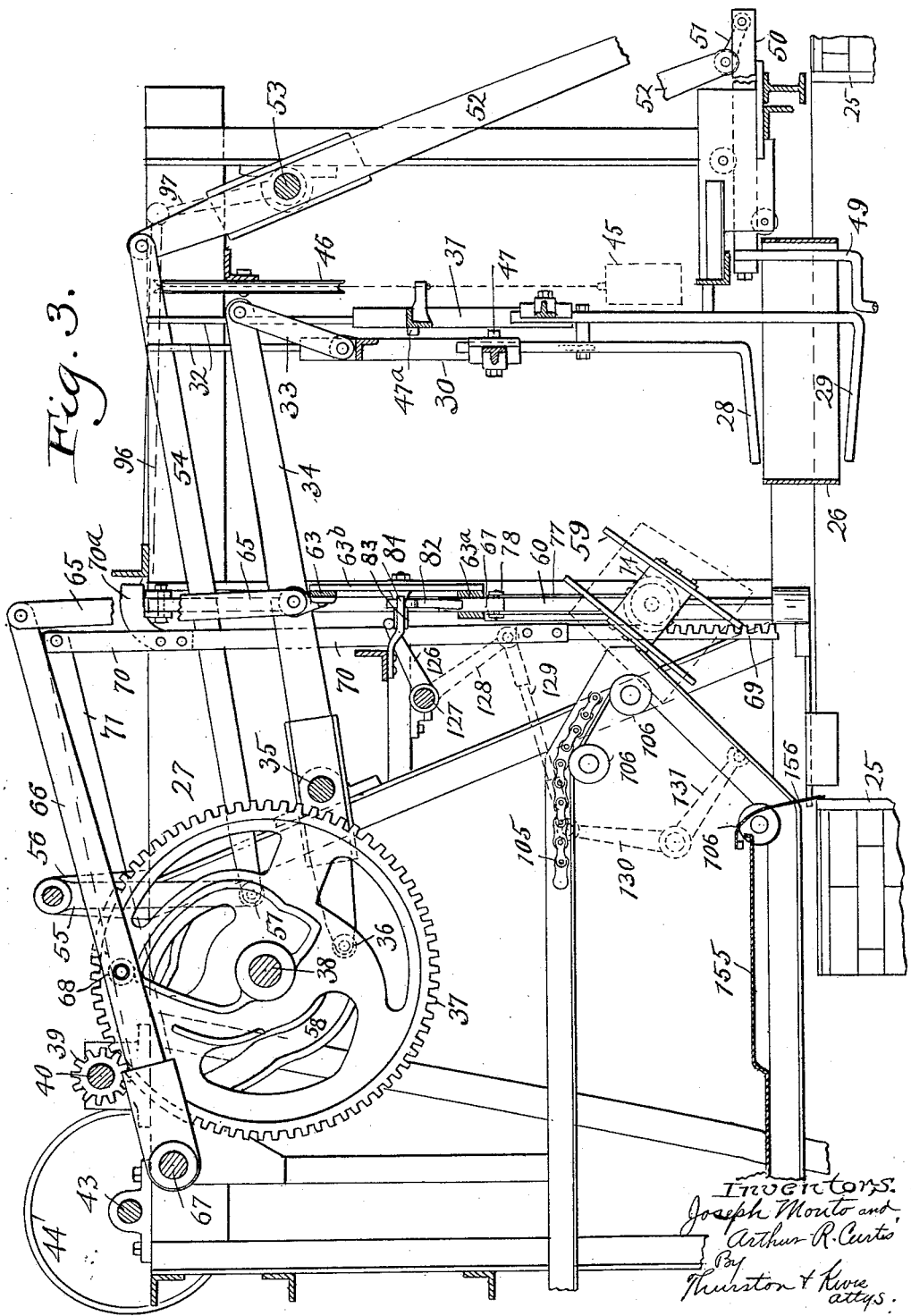

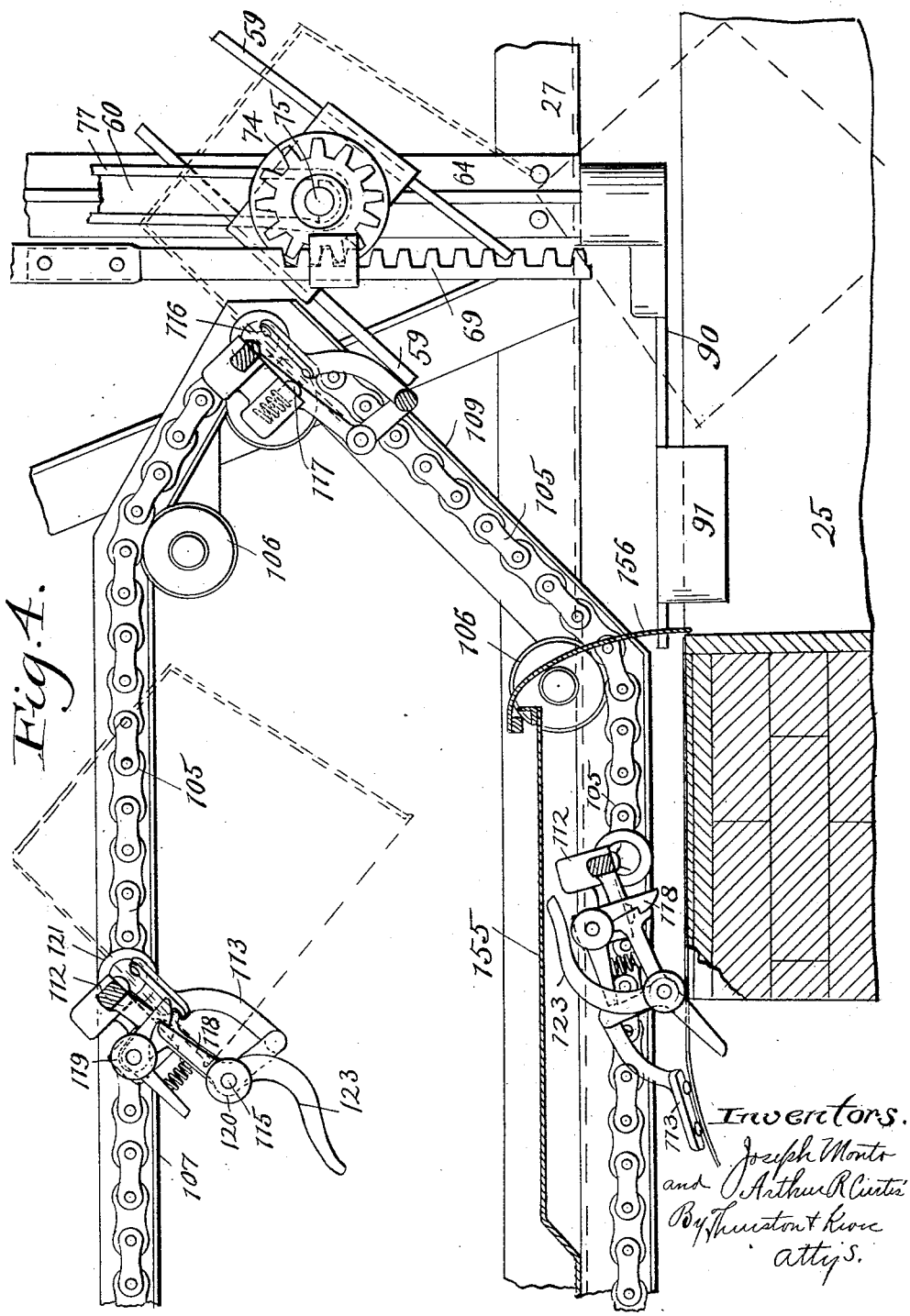

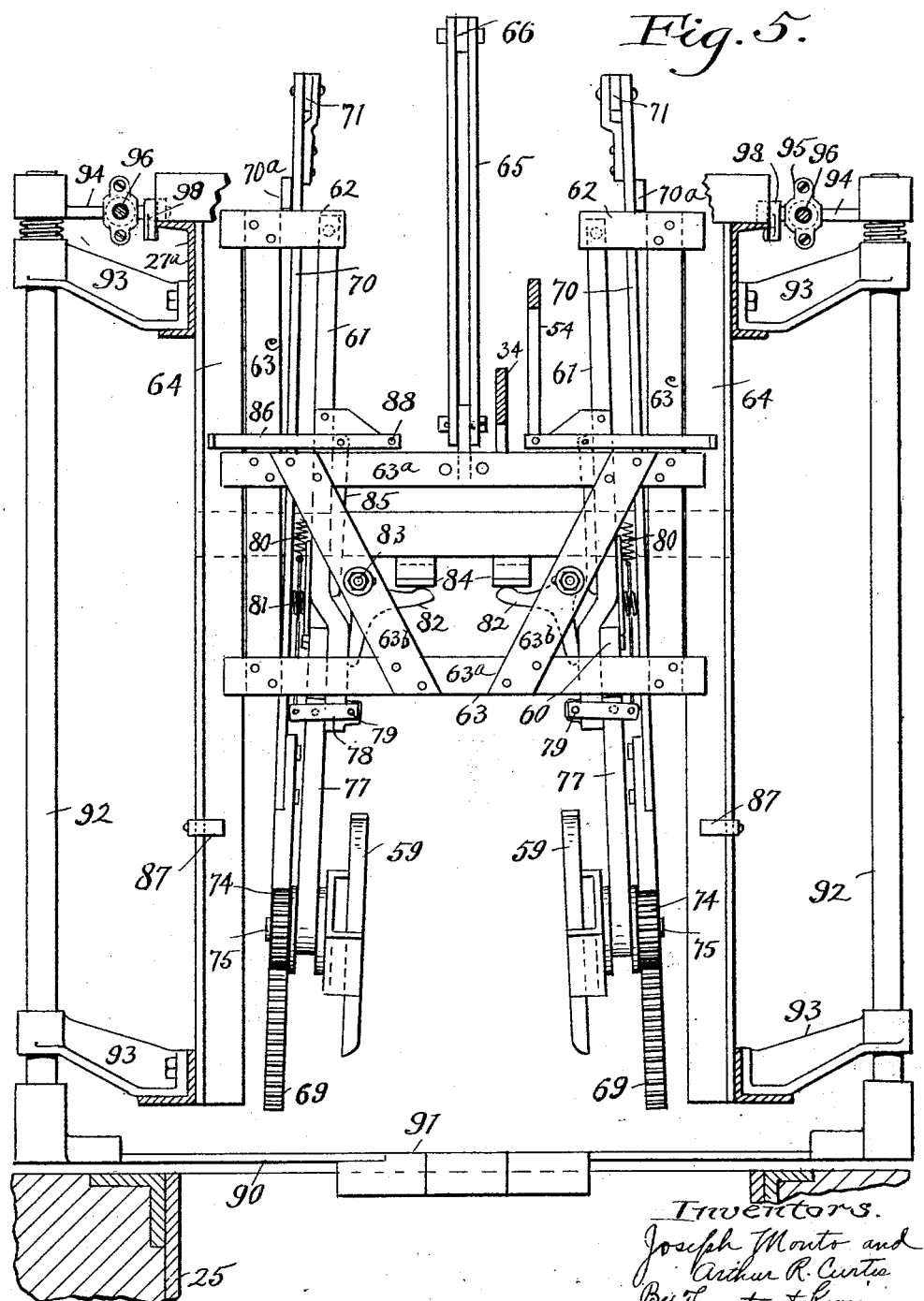

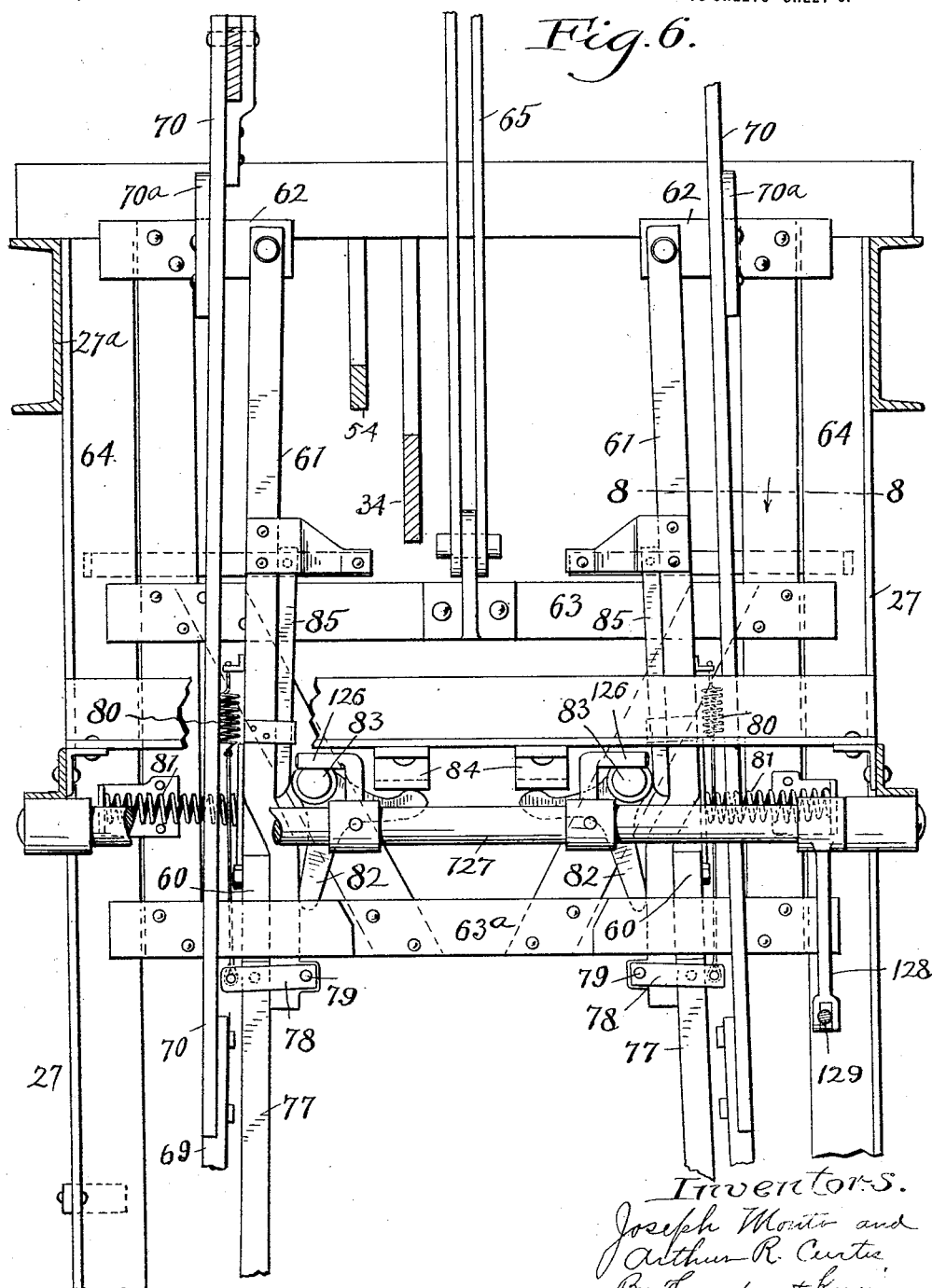

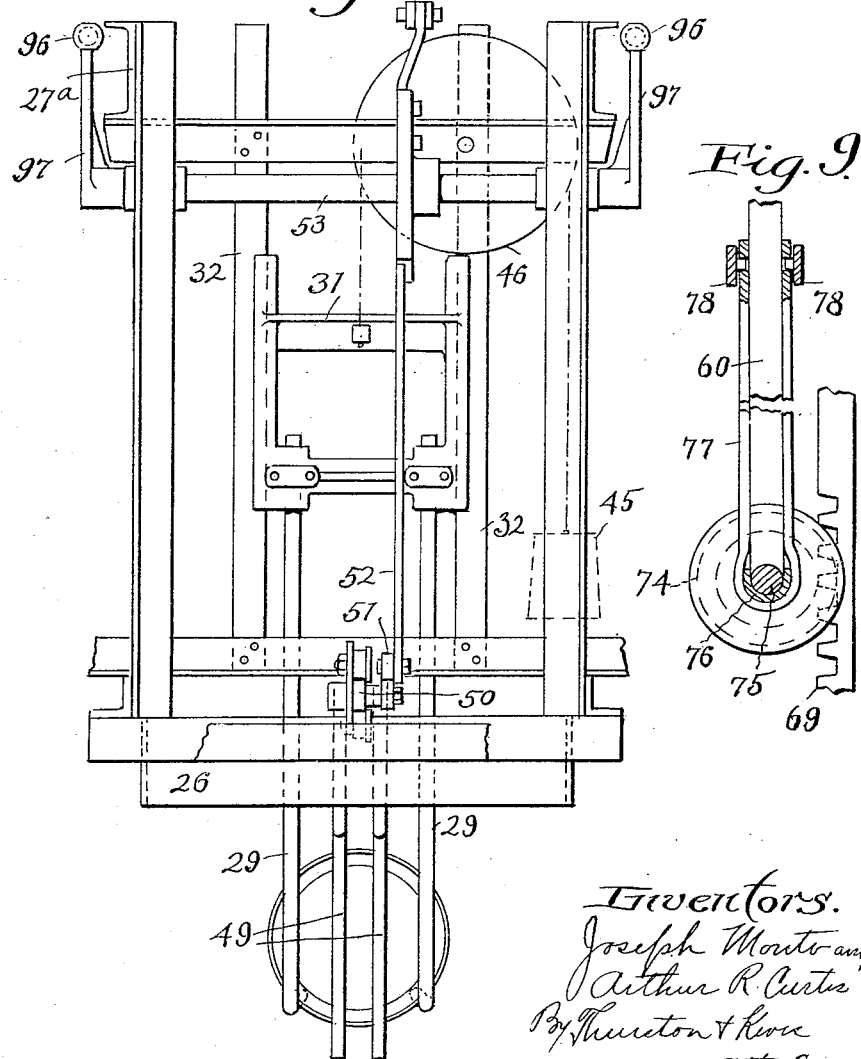

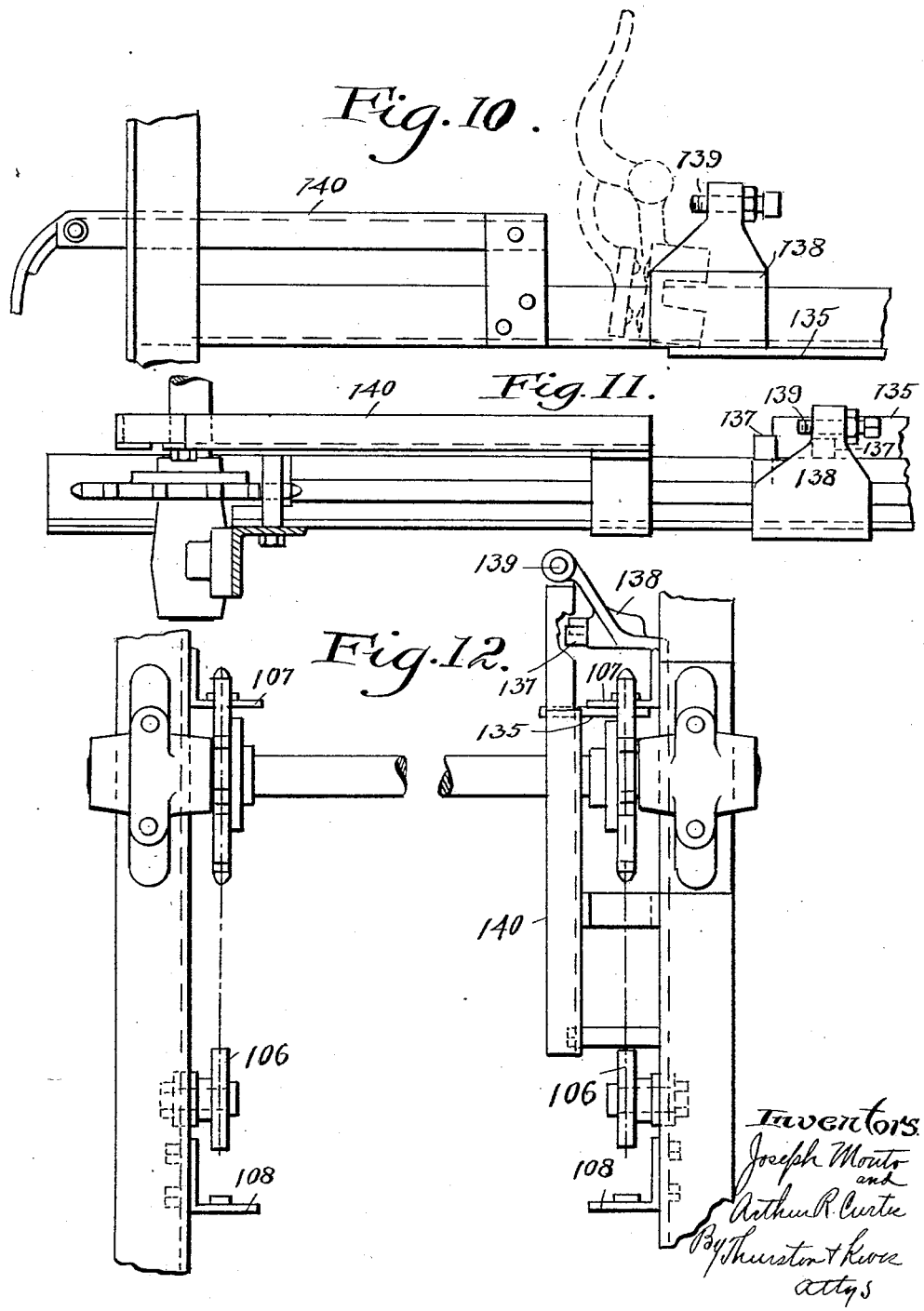

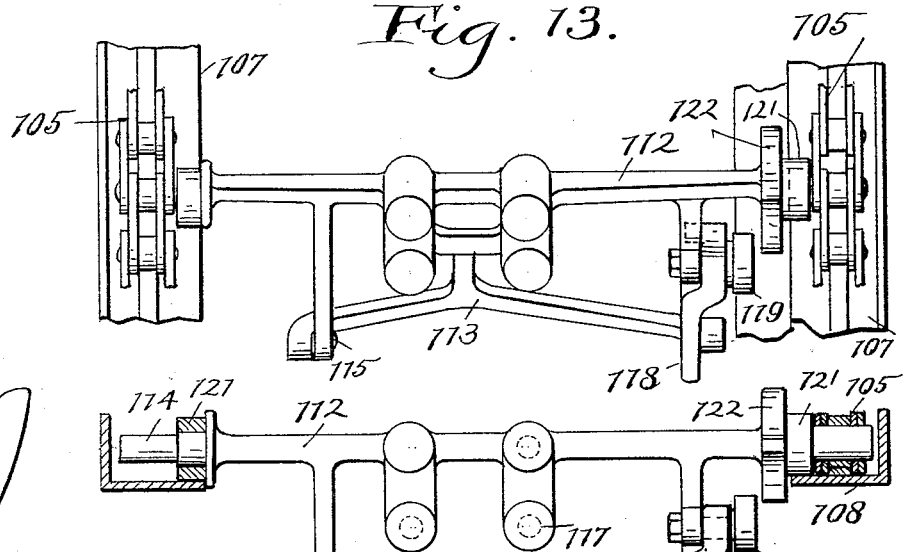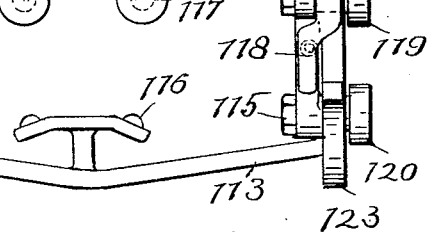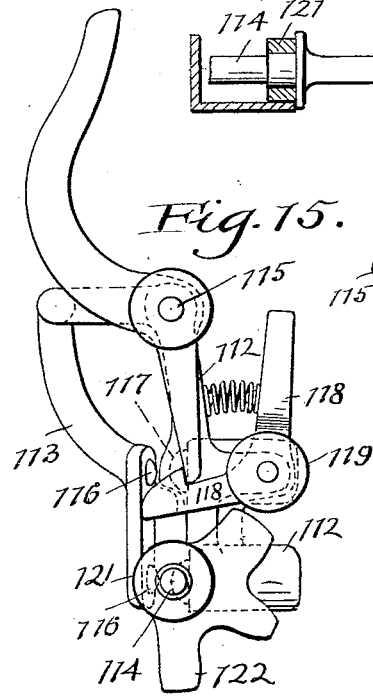

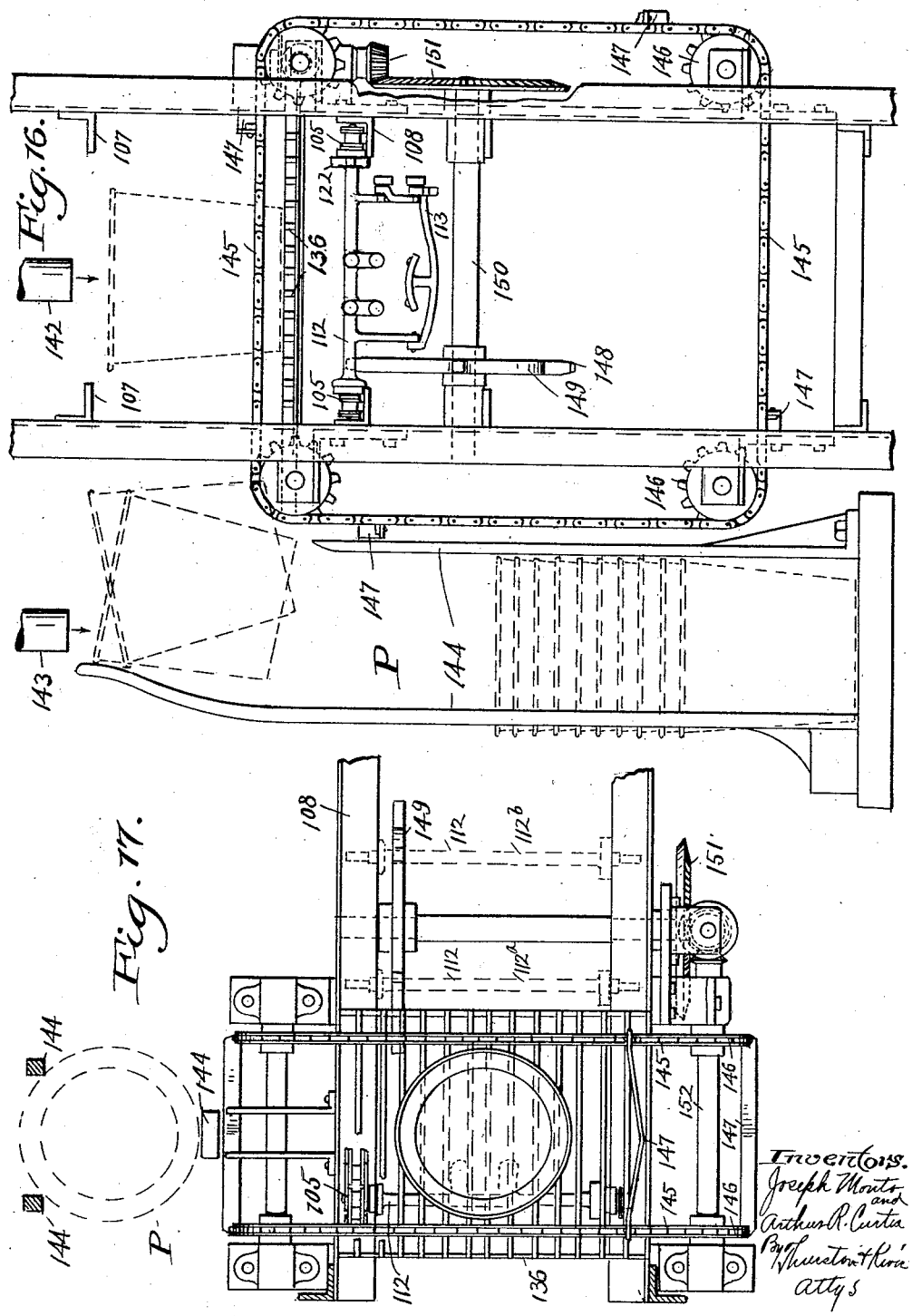

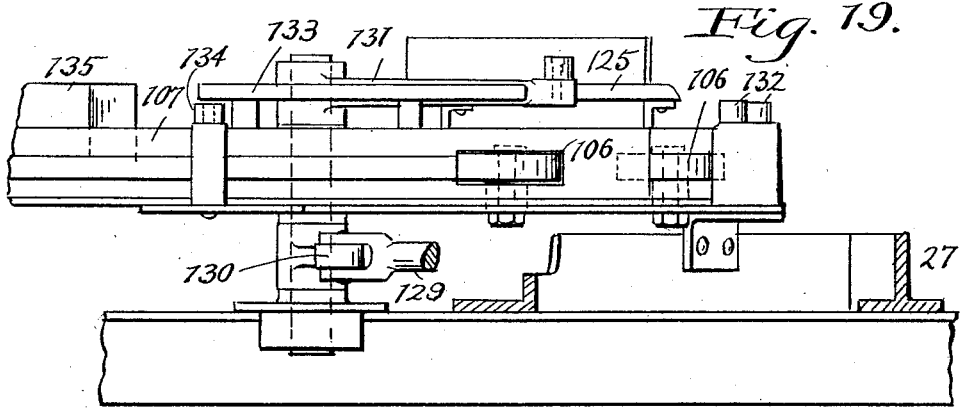
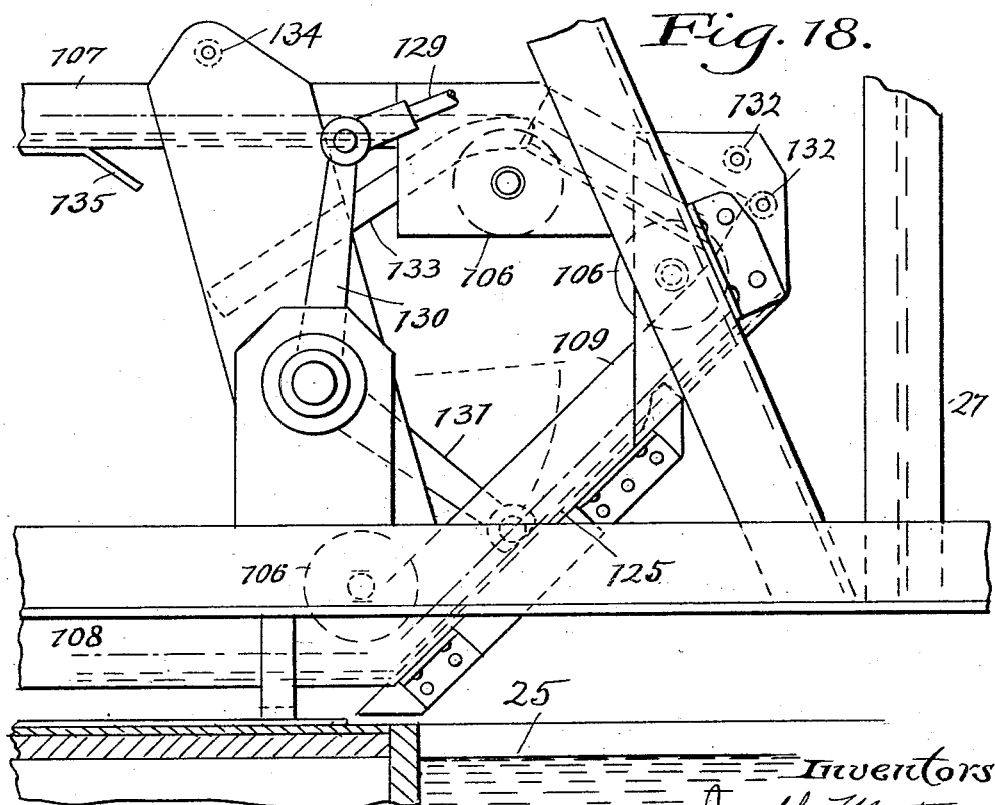

J. MONTO AND A. R. CURTIS.
METAL COATING MACHINE.
APPLICATION FILED SEPT. 26, 1917. RENEWED OCT. 4, 1920.
1,383,555.
Patented July 5, 1921.
13 SHEETS—SHEET 12.
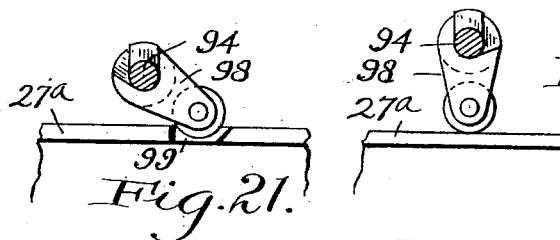
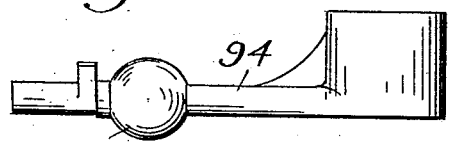
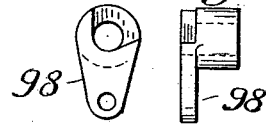
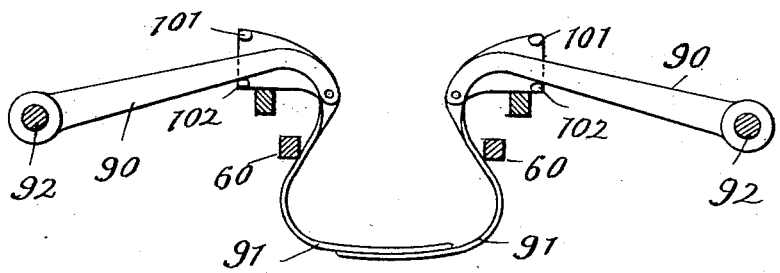
Inventors.
Joseph Monto and
Arthur R. Curtis
By Thurston & Kwon
attys

UNITED STATES PATENT OFFICE.

JOSEPH MONTO, OF CLEVELAND HEIGHTS, AND ARTHUR R. CURTIS, OF CLEVELAND, OHIO; SAID CURTIS ASSIGNOR TO CLARENCE J. HAYS, OF CLEVELAND, OHIO.

METAL-COATING MACHINE.

1,383,555.   Specification of Letters Patent.   Patented July 5, 1921.

Application filed September 26, 1917, Serial No. 193,372. Renewed October 4, 1920. Serial No. 414,619.

*To all whom it may concern:*

Be it known that we, JOSEPH MONTO and ARTHUR R. CURTIS, citizens of the United States, and residents, respectively, of Cleveland Heights in the county of Cuyahoga and State of Ohio, and Cleveland, in the county of Cuyahoga and State of Ohio, have invented a certain new and useful Improvement in Metal-Coating Machines, of which the following is a full, clear, and exact description.

This invention relates to a galvanizing or metal coating machine, such, for example, as are used for galvanizing pails and other vessels or articles, the present machine being adapted particularly for galvanizing pails.

One of the principal objects of the present invention is to carry or conduct the articles to be galvanized into, through, out of and away from the metal bath in such a manner as to leave the desired amount, and in fact, the smallest possible amount of metal on the articles.

A further object is to carry the articles from the galvanizing means, that is to say, from the parts of the machine in which the articles are coated, in such a manner as to make the time allowed for the hot metal to set independent of the time consumed in galvanizing or coating the articles.

A further object is to provide a machine which is highly efficient in action, which is automatic in character, which will accommodate articles of different sizes with practically no changes or adjustments, and which will convey the articles through the galvanizing bath, withdraw them therefrom in the desired manner, convey them away from the bath until the metal is set, then drop them onto a suitable receiving support, and finally cool and stack them.

The invention has numerous additional objects which will appear from the following description.

It may be mentioned at this point that three things or conditions affect the amount of metal left on galvanized articles, namely, the length of time that the articles are in the fluid metal, the rate at which they are drawn out of the metal, and the manner in which they are withdrawn.

In order that the desired amount of metal will be caused to adhere to the article being galvanized, the latter should be in the metal the shortest time possible, it should be drawn through the surface in taking it out of the metal bath at a certain not too rapid rate, and it should be withdrawn from the metal in such a manner as to keep the surfaces being coated (the sides and bottom of the article) as near perpendicular as possible to the surface of the metal.

The desired results or the desired conditions or manner of operation and all of the above mentioned and numerous additional objects are attained by our invention, which may be briefly summarized as consisting in certain novel combinations and arrangements of parts and details of construction which will be described in the specification and set forth in the appended claims.

Figure 2:
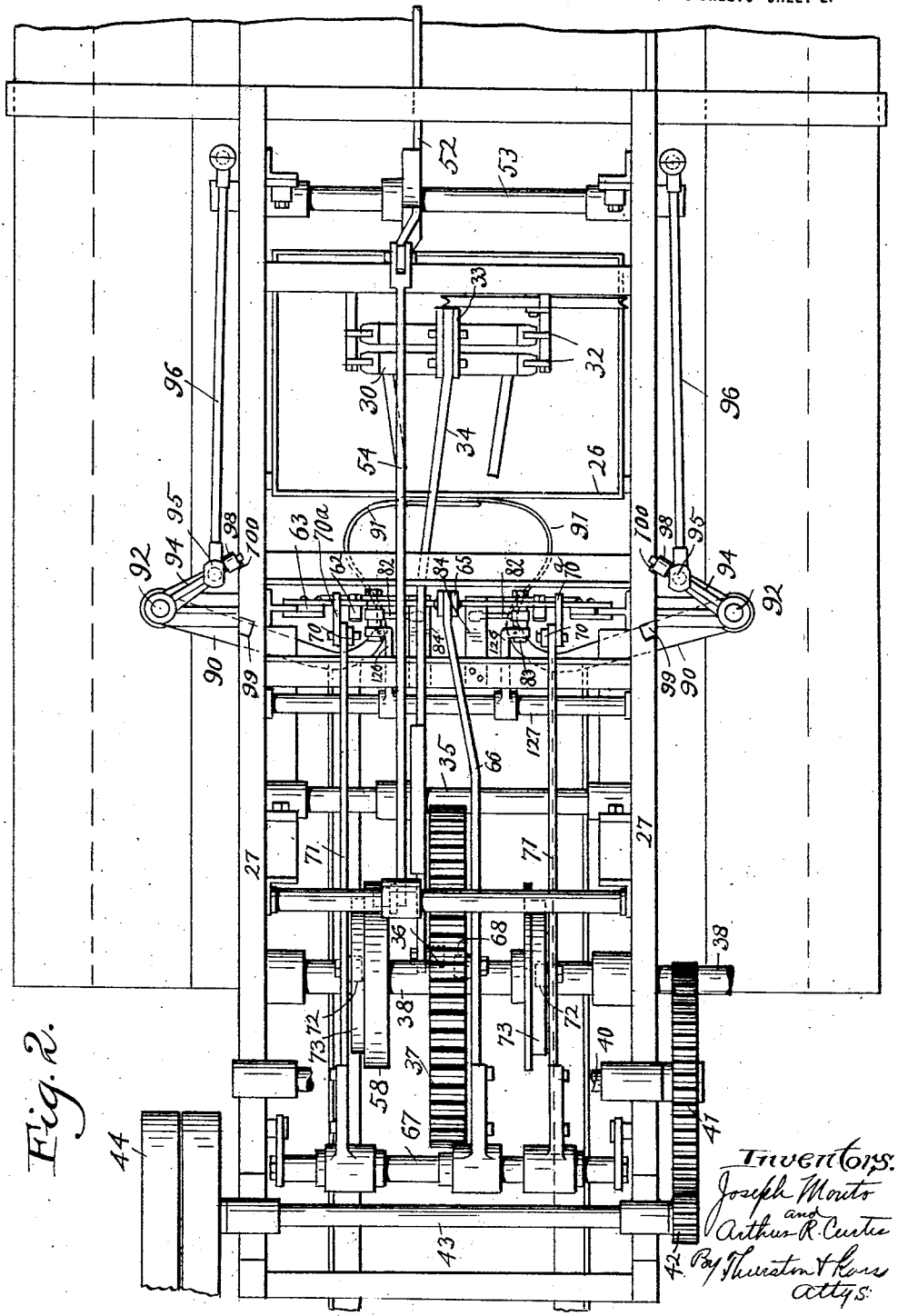
Figure 26:
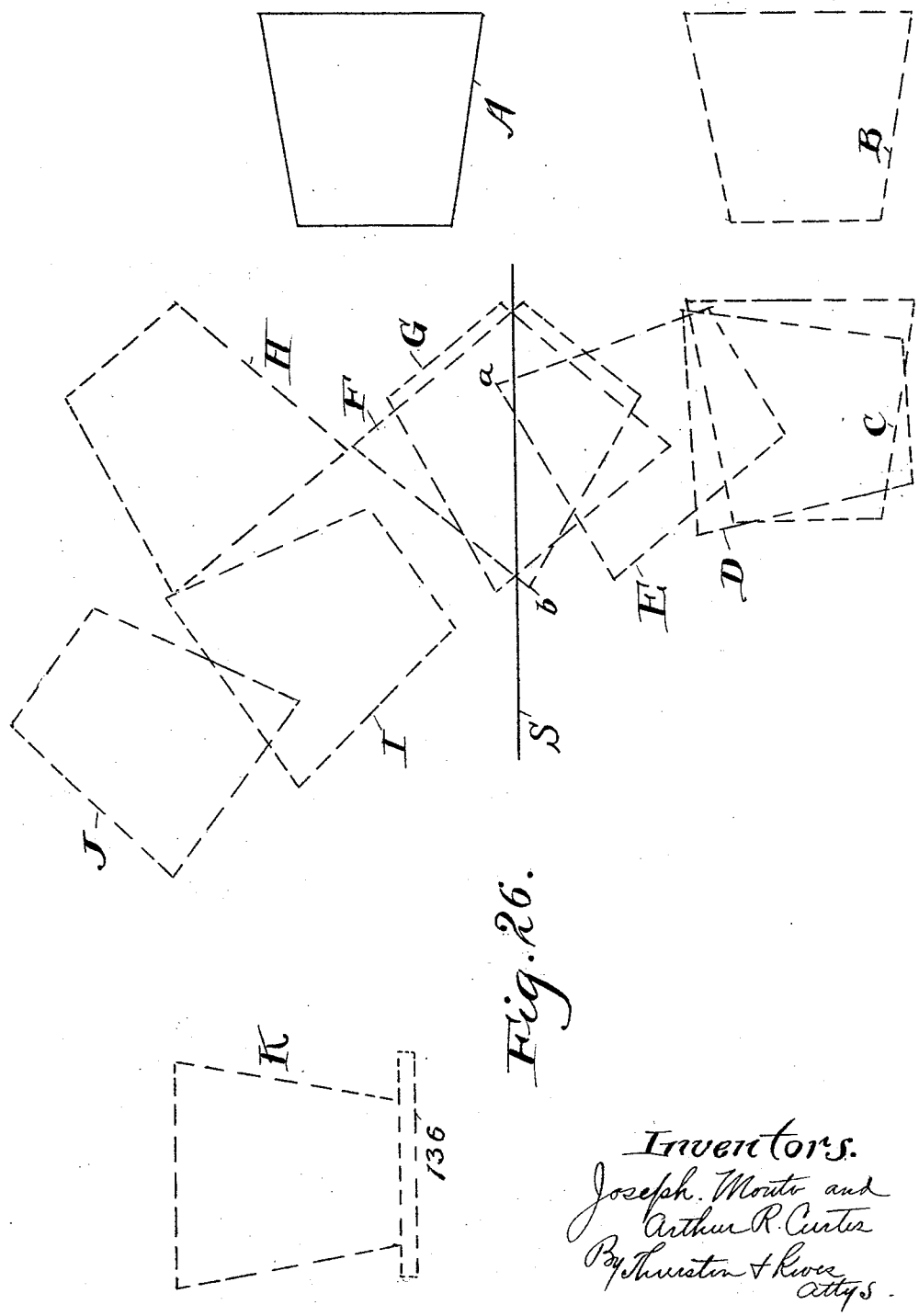

In the accompanying sheets of drawings, wherein we have shown the preferred form of our invention, Figure 1 is a side elevation of the machine; Fig. 2 is a top plan view on a slightly enlarged scale showing the front portion of the machine; Fig. 3 is a partial side view and partial vertical sectional view of the structure shown in Fig. 2, the section being taken from front to rear inside the longitudinally extending side frame members; Fig. 4 is an enlarged longitudinal sectional view of certain parts of the machine at the front end thereof including portions of the emerging device or apparatus which lifts the articles from the galvanizing bath and portions of the apparatus which conveys the articles therefrom; Fig. 5 is a view partly in front end elevation and partly in section substantially along the dotted line 5—5 of Fig. 1, looking in the direction indicated by the arrows; Fig. 6 is a sectional view substantially along the line 6—6 of Fig. 1, looking in the direction indicated by the arrows; Fig. 7 is a view looking toward the front end of the machine; Fig. 8 is an enlarged sectional detail view of a portion of the emerging or elevating apparatus which withdraws the articles from the bath, the section being taken along the line 8—8 of Fig. 6; Fig. 9 is a detail sectional view showing one of the special bearings for the jaws of the emerging device; Fig. 10 is an enlarged side view of a portion of the rear end of the machine showing particularly the trip bracket which times the dropping of the pails from the carrier; Fig. 11 is a plan view of the structure shown in Fig. 10; Fig. 12 is an enlarged view looking toward the rear end of the machine showing particularly the structure of Figs. 10 and 11; Figs. 13, 14 and 15 are views of one of the pail grippers of the carrier, Fig. 13 being a plan view of the device when traveling rearwardly along the upper guide or rail, Fig. 14 being a rear view of the same when traveling forwardly in open position along the lower rail or guide of the carrier, and Fig. 15 being an end view of the same in closed position; Fig. 16 is an end view of the machine showing particularly the stacking mechanism; Fig. 17 is a top plan view of the structure shown in Fig. 16 with parts in section; Fig. 18 is a side elevation of the front part of the carrier and the associated parts; Fig. 19 is a top plan view of the structure shown in Fig. 18; Fig. 20 is a sectional plan view showing particularly the skimmer; Figs. 21 and 22 show certain details of the skimmer operating mechanism, Fig. 21 showing the position of a so-called toggle member during the skimming stroke, and Fig. 22 showing the same during the return stroke; Figs. 23, 24 and 25 show details of the skimmer operating mechanism; and Fig. 26 is a diagrammatic view showing the different positions of the pail as it is passing through the machine from the submerging device to the stacker.

The machine constituting the subject matter of our invention contains certain main coöperating parts or devices which include:

(1) The submerging device into which the articles to be galvanized are placed by the operator, and which carries the same vertically downward through the flux (in the flux box) and into and below the surface of the fluid metal in the galvanizing tank or receptacle.

(2) The transfer device which pushes the articles (while beneath the surface of the metal) horizontally out of the submerging device into the emerging device.

(3) The emerging device which receives the articles from the transfer device and which elevates and turns them so as to bring them through the surface of the metal in the desired manner referred to above.

(4) The skimmer which skims the oxids and foreign matter from the surface of the metal just before the articles are lifted therethrough by the emerging apparatus.

(5) The carrier which receives the articles when released by the emerging device, turns them in the best manner to drain off the excess metal both from certain portions of the exterior and the interior thereof, and carries the articles until the metal is approximately set and will no longer flow, and then discharges them onto a grating or similar receiving support at the end of the machine.

(6) The stacker which draws the articles across the grating to scrape off the irregularities of metal around the bottom edge, and then drops the articles one at a time each in the other in a stack.

The machine will for the sake of clearness be described by referring to the main parts or devices above referred to in the order named, following as much as possible the sequence of operations which take place as the articles pass through the machine.

Inasmuch as this machine has particular utility for, and contains certain details designed especially to accommodate metal pails, the articles to be galvanized will for convenience be referred to as pails, this expression being used, however, not in a limiting sense, for it is to be understood at the outset that all or practically all of the features of the invention can be utilized with substantially equal facility for galvanizing any other vessel or article.

The machine includes a tank or receptacle 25 containing the hot fluid metal with which the pails are coated or galvanized. This receptacle may be of any suitable construction and may be formed of any suitable materials. At the top of this receptacle there is a so-called flux box 26 which is a rectangular frame extending partly above and partly below the surface of the metal in the receptacle 25, and adapted to contain flux which will float on the surface of the metal, the pails being passed through this flux box, and then down into and beneath the surface of the metal. Above the receptacle 25 is a frame-work 27 which extends a suitable distance to the rear of the machine, this frame-work being formed principally of structural material, and supporting practically all of the parts of the machine.

The pails are lowered through the flux box and into the metal bath by the submerging apparatus which includes two upper pail gripping bars 28 and two lower pail gripping bars 29 which extend substantially horizontally, but which as here shown are slightly inclined with respect to each other. These two sets of bars 28 and 29 which are independently and relatively movable, are carried respectively by two sliding frames 30 and 31 (see particularly Figs. 2 and 3) which frames are mounted for vertical sliding movement in guides 32 rigidly supported at the front part of the machine. Only the front frame 30 carrying the upper bars 28 is positively actuated, this frame being moved up and down through the medium of a link 33 connected to a lever 34 mounted on a cross shaft 35, and at its rear end having a roller 36 engaging in a suitably shaped cam groove on one face of a member 37 constituting a combined cam and driving gear. This member which is fixed to a transverse cam shaft 38, is engaged by a pinion 39 mounted on a shaft 40 extending across the upper part of the machine (the major portion of this shaft being broken away in Fig. 2) which shaft has at one side of the machine a gear 41 engaged by a pinion 42 on a shaft 43 having pulleys 44 by which power is applied to the machine to operate it.

Referring now again to the submerging apparatus, at each revolution of the cam member 37, the frame 30 and the upper rods 28 will be positively raised and lowered, certain portions of this movement being transmitted to the front frame 31 which is counterbalanced by a counterweight 45 (see Fig. 3) to which is connected a cable passing over a sheave 46 and connected to the frame. On the upward movement of the frame 30, after the bars 28 have moved a predetermined distance away from the bars 29, lugs 47 on the rear frame 30 engage similar lugs 47$^a$ on the front frame 31, and elevate the frame 31 and the lower bars 29 up above the flux box 26, or to a position such that a pail may be placed by the operator onto the lower bars 29. Thereupon upon the downward movement of the frame 30, the bars 28 move downward toward the pail until they engage the top thereof after which all four bars are lowered carrying the pail through the flux box 26 and down into the fluid metal. In Fig. 26 position A represents the initial position of the pail at the start of the downward movement, and position B indicates the lowermost position to which it is moved by the submerging apparatus. This position is likewise indicated in Fig. 1.

When the pail reaches position B, it is shifted by the transfer apparatus or device out of the bars or jaws of the submerging apparatus horizontally rearward into the jaws of the emerging apparatus or device. This transfer is effected through the medium of a pair of pusher bars 49 which extend downwardly into the metal as shown in Fig. 1 and other figures, and which are periodically actuated by a horizontally sliding frame 50 which is connected through the medium of a link 51 to a lever 52 supported on a transverse shaft 53 at the front of the machine. The upper end of this lever is connected to an arm 54 which extends rearward and at its rear end is swung from an arm 55 pivotally supported on a bracket 56. The extreme rear end of this arm is provided with a roller 57 which engages in a suitably shaped cam groove of a cam 58 (see Fig. 2) secured to the transverse cam shaft 38.

As the pail is pushed by this transfer apparatus out from between the bars 28, 29 of the submerging apparatus, the latter automatically spread to allow this transfer movement to take place. Then the rear frame 30 of the submerging apparatus is elevated, carrying the upper bars 28 away from the lower bars 29, until the lugs 47 engage the lugs 47$^a$ whereupon the counterbalanced frame 31 is elevated, bringing the lower bars 29 up to a position to again receive the next pail, which will be placed on the bars 29 by the operator as in the first instance.

It should be noted in passing, that the construction of the submerging apparatus is such that no adjustments or changes are required to adapt it for pails of different sizes.

The emerging device into which the pails are pushed by the transfer device constitutes a very important part of our invention, this device serving not only to elevate the pail from the fluid metal but to turn it, the device giving the pail definite turning and elevating movements, which at times take place simultaneously and at times separately to cause the different portions of the pail to pass through the surface of the metal in the proper manner, which will be subsequently described. The position of the pail when received by the emerging apparatus is indicated at C in Figs. 1 and 26.

This emerging apparatus shown in front elevation in Fig. 5, and the portion shown in rear elevation in Fig. 6, includes two laterally movable jaws 59 which receive between them the pail when in position C, and which automatically move inward so as to grip the pail, and after elevating and turning it, automatically move apart to release the pail so that it can be gripped and carried away by the carrying apparatus hereinafter described. These jaws 59 are rotatably mounted at the lower ends of a pair of bars 60 which are secured to bars 61 which at their upper ends are pivoted to bracket-like extensions 62 of a frame 63 mounted for vertical sliding movement in the main frame. It will be observed by reference to Figs. 5 and 6, that this frame includes horizontal members 63$^a$, diagonal members 63$^b$ and vertical members 63$^c$, the latter being alongside of vertical guide members 64 on the main frame. This frame 63 is raised and lowered through mechanism including links 65 which connect the frame to a lever 66, the rear end of which is journaled on a transverse shaft 67 (see Figs. 2 and 3) and which is provided between its ends with a roller 68 engaging in a suitably shaped cam groove on the side or face of the combined gear and cam member 37 opposite to that face which controls the submerging apparatus.

Turning movements are imparted to the pail gripping jaws of this apparatus independently of the elevating movements and elevating mechanism through the medium of vertically movable racks 69 carried by bars 70 which are moved up and down by levers 71, which at their rear ends are mounted on the transverse shaft 67 previously referred to and are provided between their ends with rollers 72 engaging in suitably shaped cam grooves of cams 73 secured to the cam shaft 38. These racks 69 engage pinions 74 which are mounted at the outer ends of studs or short shafts 75 to the inner ends of which the jaws of this emerging apparatus are secured, the pinions being secured to the outer ends of said studs or shafts.

These studs carrying the pinion and pail gripping jaws are journaled in novel bearings which will automatically expand or contract as the hot metal first builds onto the bearing parts and then wears off, eating them away. For the accomplishment of this, these studs are held between the lower ends of the bars 60, which are given a substantially semi-circular concavity, and substantially semi-circular bearing members 76 (see Fig. 9) the latter being held against the studs, and the studs being held against the ends of the bars 60 by straps 77 which extend upwardly on opposite sides of the arms 60, and their upper ends are connected to levers 78 which are pivoted at 79 to the lower ends of the arms 61 and at their outer ends are connected to springs 80 which yieldingly hold the studs, straps 77, and associated parts in working position, and yield to accommodate any building up of metal on the bearings and take up for wear.

Referring again to the jaws 59 which grip the pail, it will be observed that the arms carrying the jaws are pressed yieldingly inward by springs 81 (see Figs. 6 and 8), and that they are stopped in their innermost position by engaging bell-cranks 82 which are fulcrumed on pins 83 which pins are clamped in slotted holes in the frame, (see Fig. 5) which allow them to be set so as to bring the jaws to the proper position to permit the pail to be pushed into the same, the springs serving to cause the jaws to grip the pail in a yielding manner. This is the only setting that is required to be made on any part of the machine for different sizes of pails, all other adjustments being automatic. The pail after being received by the jaws when the latter and the pail are in their lowermost position, is raised and turned in the manner hereinafter described, and when at its highest position is transferred to the grippers of the carrier or carrying mechanism shortly to be described.

To release the pail from these jaws at its uppermost position, the upper legs of the bell-cranks 82 strike against stops 84 which spread the jaws as shown in Fig. 5. At this point the pail is gripped and removed by the clamps or grippers of the carrier. Then these jaws (reference still being had to the jaws 59 of the emerging apparatus) are temporarily locked in the spread position by lock bars 85 which drop in by gravity between the bars 61 and the hubs of the bell-cranks 82. These lock bars are pulled out on the down stroke by levers 86 to which the lock bars 85 are pivoted as shown in Figs. 5 and 6 by engaging stops 87 (see Fig. 5) on the vertical guide members 64, these levers 86 being pivoted at 88 on bracket-like extensions of the bars 61. This sets the jaws 59 in their innermost position ready to receive the next pail which is pushed into the same by the transfer device previously described.

At this point it will be advisable to describe the different movements which are imparted to the pail by this elevating and turning emerging apparatus. It was previously stated that the pail is started at position A, is lowered by the submerging apparatus to position B, and is pushed over to position C by the transfer apparatus which delivers the pail from the jaws of the submerging apparatus to the jaws of the emerging apparatus. Next, by the movement of the racks the pail is turned through slightly more than 90° to position D. Then it is elevated and turned further to position E so that the edge $a$ will cut through the surface of the metal, which surface is indicated at S. Then the pail rises until the center of the pail is about at the surface, this position being indicated at F, the pail turning as it is raised so as to be sure to keep edge $b$ under the surface. Then from position F to position G the pail turns only until edge $a$ is about to strike the surface of the metal, after which said pail rises to position H, turning slightly as shown, making a total of about 135° of turning. These movements bring the sides and bottom of the pail out of the metal as near as possible perpendicular to the surface of the metal. Then the carrier receives the pail from the jaws of the emerging apparatus, and swings it to position I to drain the metal from the depression on the outside of the bottom of the pail, and then raises it to position J and carries it in this position, draining the excess metal from the interior of the pail and dropping it in the position K.

After the pail is lifted out of the metal it is no longer turned by the jaws of the emerging mechanism. In fact, after the pail is above the surface of the metal, the frame 63 engages hooks 70ª (see Fig. 3) of the rack bars 70 lifting the levers 71 and causing the rollers carried thereby to move out of operative engagement with the cams 73 until the downward stroke of the frame is started and the frame moves clear of these hooks.

Before describing the carrying mechanism we will describe the skimmer which skims from the surface of the metal the oxids just before the pail is elevated by the emerging apparatus. This skimmer includes two levers 90 (see Fig. 2 and Fig. 20) to which are pivoted skimmer blades 91. These levers are secured to the lower ends of rock shafts 92, which are mounted in bearings 93 projecting laterally from the main frame, the shafts extending vertically along the sides of the same. The shafts are designed to be turned back and forth through a suitable angle, and also to be elevated in the bearings 93, so that when the skimmers are moving back they will pass over the surface of the metal, and when moved in the reverse direction will extend down into the surface of the metal so as to clean it. This turning and elevating of the shafts are accomplished by means of arms 94 which are secured to the upper ends of the shafts 92, and extend inwardly toward the upper side frame members 27$^a$ which are in the form of channels. These arms 94 are connected by ball and socket joints 95 to connecting rods 96 which extend toward the front end of the machine and are connected by levers 97 (see Fig. 1) to the rock shaft 53 which was previously mentioned in the description of the transfer device. The levers 94 which as before stated, are attached to the upper ends of the vertical shafts 92, have at their inner ends toggle members 98 which are free to turn through a definite angle on the levers 94, and are provided at their lower ends with rollers which are adapted to ride over the upper flanges of the channels 27$^a$ of the frame 27. These parts are so disposed that during the skimming stroke of the skimmer blades, that is, when the levers 94 are being swung through the described mechanism toward the rear of the machine, the toggle members are in an inclined position, (see Fig. 21) allowing the shafts 92 and skimmer blades to swing through the skimming stroke in lowered position, but after the skimming stroke is completed, the rollers at the lower ends of the toggle members 98 drop into notches 99 of the channels 27$^a$, whereupon on the return stroke of the parts, these toggle members straighten up, (see Fig. 22) elevating the shafts 92 and skimmer blades so that the latter will on returning, pass over the surface of the metal. On the completion of the return stroke the toggle members drop into other notches 100 of the channels 10$^a$, allowing the skimming mechanism to drop to operative position ready for the next skimming stroke.

By referring to Fig. 20 it will be seen that the skimmer blades must skim up close to the bars 60 which at their lower ends rotatably support the jaws of the emerging apparatus, and as the spacing of these bars depends upon the size of the pail being galvanized, these skimmers are made automatically adjustable to this spacing. The skimmer blades 91 are pivoted as shown in Fig. 20, on the levers, as before stated, and they have extensions carrying lugs 101 and 102 which are adapted to engage the sides of the levers 90. Thus the blades 91 may swing in and out within limits determined by the spacing of these lugs, lugs 102 being placed to limit the maximum spread of the skimmer blades (for the largest pails), and lugs 101 to limit the minimum spread which is such as to just allow the blades to pass between the bars 60 when they are clamping the smallest pail.

In operation, as the skimmer blades start to skim, the reaction of skimming where the blades overlap will cause the blades to hug the bars 60 until they are free from the same, and then they will automatically open out until lugs 102 engage the levers 90. On the return stroke the curved parts of the skimmer blades will strike the bars 60 and thus automatically contract so as to pass between the same. When completely in, lugs 102 of the extensions on the blades strike the levers 90 as shown in Fig. 20, and this swings the skimmer blades out again to, or substantially to the bars 60. It will be understood, of course, that as soon as the metal is skimmed, the pail is brought to the surface of the metal by the emerging apparatus, and when the pail is elevated free from the metal, the skimmers are returned to normal position ready for the next skimming operation.

Taking up again the travel of the pail through the machine, we will describe the carrier which receives the pails, one at a time from the emerging apparatus and carries them rearwardly to the rear end of the machine. This carrier includes two endless chains 105 which extend a suitable distance to the rear of the emerging apparatus, and which pass about several idler rollers 106, suitably positioned in the frame 27, and are guided by upper and lower angles 107 and 108 and inclined angles 109 near the front end of the carrier frame. The conveyer of the carrier is driven through suitable gears from the cam shaft 38, and a sprocket chain 110 which extends rearwardly to and drives a driving sprocket 111 at the rear end of the machine (see Fig. 1).

These chains carry pail grippers, each consisting of two members 112 and 113, the former being the main gripper member which extends across or between the two chains 105, and has at its ends trunnions 114 fitting into the latter, and the two gripper members being hinged together at 115. The pail is clamped between four fixed buttons 116 on gripper member 113, and four spring pressed buttons 117 on member 112, these giving a yielding grip on the side of the pail. The jaws of the gripper members are held in clamping position on the pail by a bell-crank latch 118.

Mounted on the fulcrum pin for bell-crank latch 118 is a roller 119, and mounted on one of the hinge pins between the members 112 and 113 is a similar roller 120. Additionally the trunnions 114 have rollers 121 which run along the guide rails 107 and 108. Furthermore, one of the trunnions for member 112 has three gear teeth 122, and the gripper member 113 has a curved tail piece 123. The two rollers 119 and 120, the gear teeth 122, and the tail piece 123 coöperate with other parts to be referred to presently, to turn the grippers into several different positions, and also to cause clamping engagement between the jaws.

The conveyer chains are equipped with a series of transverse pail grippers such as above described, these being equally spaced and being brought successively in predetermined timed relationship with respect to the movements of the other parts of the machine already described, up to the forward end of the conveyer frame, which is the point at which the grippers of the carrier receive the pails.

The operation is as follows: The chain conveyer is dragging one of the pail grippers up the incline at the forward end of the machine at the same time that a pail is being brought up by the emerging device, the two rollers 119 and 120 of the pail clamp then riding up an inclined guide bar 125 (see particularly Fig. 18) and the curved tail piece which forms part of the gripper member 113 extending forwardly. Then the closing and locking of the gripper members is accomplished by the pins 83 upon which the bell-cranks 82 (see Fig. 6) of the emerging device are fulcrumed, striking the under side of levers 126 (see Fig. 6) secured to a cross shaft 127 extending across the machine. This shaft has connected to it a downwardly extending lever 128 to which is connected a connecting rod 129 which operates a bell-crank having two lever arms 130 and 131, the latter of which has at its lower end a roller so disposed that when the pins 83 before described, engage and rock the levers 126, shaft 127, lever 128, and through connecting rod 129, the bell-crank 130, 131, said roller engages under the curved tail piece of the pail gripper, thus closing the jaws thereof against the pail, whereupon the locking latch 118 of the gripper locks the two jaws together just as the pail is released by the jaws of the emerging device.

When this takes place the pail is in substantially the position H of Fig. 26. Next the gear teeth 122 on one of the trunnions of the gripper member 112 engage two rollers 132, (see Figs. 18 and 19) bringing the roller 120 on the hinge pin of the gripper up on inclined guide bar 133 (see Fig. 18) which swings the gripper and the pail from position H to substantially position I of Fig. 26, so that metal can drain from the depression on the under side of the pail, and then the gear teeth 122 of the gripper engage another roller 134, swinging the pail to substantially the position J, and causing the roller 119 of the gripper to engage and ride over the guide 135, a portion of which is shown in Figs. 10, 11, 12, 18 and 19. The gripper then continues its rearward movement with the last mentioned roller traveling on this guide toward the rear end of the machine.

The pail is carried in this position until the metal is just barely set, and it is then dropped to position K of Fig. 26, this position likewise being shown in Fig. 1, onto a grating 136 at the rear end of the machine. This is accomplished as follows: When the gripper and the pail carried by it reach a certain definite position, the gear teeth 122 of the gripper engage with two rollers 137, shown in Figs. 11 and 12, these rollers being carried by a trip bracket 138 adjustably secured to the frame. These rollers cause the gripper to be turned so that the leg of latch 118 of the gripper strikes a set screw 139 of the trip bracket which releases the latch, allowing the gripper jaws to open and release the pail which then drops onto the grating 136. The gripper now swings over until the hinge roller 120 rests on a rear guide 140 until it passes over the rear end of the machine.

By properly locating the trip bracket 138 which can be adjusted to any point, the time given for the metal to set on the pail can be made anything desired, and independent of the rate at which the pails are going through the galvanizing bath. An adjustment of the trip bracket 138 will, of course, necessitate an adjustment of the grating 136 and of the stacking mechanism hereinafter described, it being understood that once the trip bracket has been set to produce the desired results when a machine is employed to galvanize an article of a given size adapted to receive a coating of given thickness, no further adjusting will be required.

When the pail drops onto the grating in the manner above described, the feather edge left from the emerging from the metal is removed by the jar incident to the drop on the grating.

We come now to the last stage of the operation, namely, the cooling and stacking of the pails, which will next be described. The pails must drop from the grippers onto the grating at a point in the setting of the metal when the flow of metal on the pail has practically ceased, but when the metal around the rim at the bottom of the pail is still soft enough so that any irregularities or burs on this edge can be raked off readily. In this condition the pails are still too hot to stack as they will stick to each other. To remedy this, a fan or blower (not shown) is provided, having a pipe or duct 142 (see Fig. 16) so positioned as to direct a strong current of air on the pails as they are dropped on the grating so as to chill them. This same blower through a branch duct 143, likewise cools the stack of pails indicated at P in Fig. 16, so that they may be handled readily.

The pails are shoved off the grating and are nested into the stack P, within the stack receiver consisting of upright members 144, at least one of which is made movable or removable so that the stack can be lifted out of the stack receiver. This stacking of the pails is accomplished through the medium of a pair of stacking chains 145 which pass transversely over the rear end of the frame down, and through the latter, about sprockets 146, these chains being connected together by transverse pusher bars 147 which engage the pails and shove them from the grating into the stack. This endless conveyer of the stacking mechanism is operated intermittently, each intermittent movement being sufficient in extent to cause one of the pusher bars to move a pail from the grating into the stack. It is moved intermittently through the gripper members 112 as they are traveling forwardly along the lower leg of the carrier after having discharged the pails. By reference to Figs. 1 and 16, particularly, it will be seen that these gripper members in their forward movement engage outstanding fingers 148 of a sprocket wheel 149, which is fixed to a shaft 150 extending transversely beneath the lower rear part of the machine, this shaft at one end being connected by suitable bevel gearing 151, shown in Figs. 1, 16 and 17, to a shaft 152 carrying two of the sprocket wheels 146, which therefore constitute the driving sprockets for these chains. In Fig. 17 we have shown by dotted lines designated 112ᵃ and 112ᵇ, the position of one of the gripper members 112 at the beginning and at the end of one of the intermittent turning movements imparted to the sprocket wheel 149 which drives the stacker chains. This turning movement is sufficient when multiplied through the bevel gearing to move the pail from the grating into the stack as aforesaid.

The pails drip metal as they pass along the carrier from the emerging apparatus to the stacker, and for that reason a deck 155 is provided along the lower part of the frame (see Fig. 4) to prevent this dripping metal from getting into the machinery of the carrier. At the forward end of this deck an apron or automatic trap door 156 is provided which will allow the gripper of the carrier to pass forwardly therethrough, and will then automatically close.

In describing this machine, the mode of operation and the functioning of the parts have been set forth in such a way that it is believed no further description of the operation need be given. It will be understood, of course, that the machine operates continuously and uninterruptedly as fast as the pails are fed into the submerging device, and that everything is done automatically from the time that the pails are placed into the lower clamp bars of the submerging device until they are stacked by the stacking mechanism after galvanization.

As before stated, while this machine is adapted particularly for galvanizing pails, it can very readily be employed for galvanizing articles of any other configuration or design as will be readily understood by one skilled in the art.

We do not desire to be confined to the exact details shown, but aim in our claims to cover all modifications in details of construction and arrangement which do not involve a departure from the spirit and scope of our invention as expressed in the appended claims.

Having described our invention, what we claim is:

1. In a metal coating machine, a receptacle for fluid coating material, apparatus for carrying articles to be coated through the material in the receptacle comprising a device for submerging the articles and including relatively and independently movable article gripping members automatically adjustable for different sizes of articles.

2. In a metal coating machine, a receptacle for fluid coating material, apparatus for carrying articles to be coated through the material in the receptacle comprising a device for submerging the articles and including article gripping members which are relatively movable and automatically move apart when the article is withdrawn therefrom.

3. In a metal coating machine, a receptacle for fluid coating material, apparatus for carrying articles to be coated through the material in the receptacle comprising a device for submerging the articles and including upper and lower article gripping members which are independently movable, and means for actuating the upper member so as to shift the lower member and an interposed article.

4. In a metal coating machine, a receptacle for fluid coating material, apparatus for carrying articles to be coated through the material in the receptacle comprising a device for submerging the articles and including upper and lower article gripping members and independently movable, vertically movable supporting devices for said members.

5. In a metal coating machine, a receptacle for fluid coating material, apparatus for carrying articles to be coated through the material in the receptacle comprising a device for submerging the articles and including upper and lower article gripping members and independently movable, vertically movable supporting devices for said members, and means for positively actuating one of said devices.

6. In a metal coating machine, a receptacle for fluid coating material, apparatus for carrying articles to be coated through the material in the receptacle comprising a device for submerging the articles and including sliding frames having upper and lower article engaging bars which are relatively and independently movable.

7. In a metal coating machine, a receptacle for fluid coating material, apparatus for passing articles through the material in the receptacle comprising a device having means for receiving, and lifting the articles from the coating material, and having means for giving the articles a turning movement independent of the lifting movement.

8. In a metal coating machine, a receptacle for fluid coating material, apparatus for passing articles through the material in the receptacle comprising a device having means for lifting an article from the coating material and means independent of the lifting means for turning the article to different positions during the lifting movement.

9. In a metal coating machine, a receptacle for fluid coating material, apparatus for passing articles through the material in the receptacle comprising a device having means for lifting an article from the coating material and turning it through predetermined angles, the lifting and turning movements being imparted both simultaneously and successively.

10. In a metal coating machine, a receptacle for fluid coating material, apparatus for carrying articles through the material in the receptacle including a submerging device and an emerging device which receives the article when submerged, said emerging device having means for lifting the article and separate means for turning it.

11. In a metal coating machine, a receptacle for fluid coating material, apparatus for conveying articles through the coating material in the receptacle and comprising a submerging device having means for receiving and lowering an article in the coating material, an emerging device having means for receiving and lifting the article from the fluid material and having means for turning the article independently of the lifting movement, and a transfer device for transferring the article from the submerging device to the emerging device.

12. In a metal coating machine, a receptacle for fluid coating material, apparatus for conveying articles through the coating material in the receptacle and comprising a submerging device having means for receiving and lowering an article in the coating material, an emerging device having means for receiving and lifting the article, and a transfer device for transferring the article from the submerging device to the emerging device, said submerging device having jaws which open automatically when the transfer device transfers the article from the submerging device to the emerging device.

13. In a metal coating machine, a receptacle for fluid coating material, apparatus for conveying articles through the coating material in the receptacle and comprising a submerging device having means for receiving and lowering an article in the coating material, an emerging device having means for receiving and lifting the article, and a transfer device for transferring the article from the submerging device to the emerging device, said emerging device having jaws which automatically open when the article is transferred from the submerging device to the emerging device.

14. In a metal coating machine, a receptacle for fluid coating material, apparatus for conveying articles through the coating material in the receptacle and comprising a submerging device having means for receiving and lowering an article in the coating material, an emerging device having means for receiving and lifting the article, and a transfer device for transferring the article from the submerging device to the emerging device, said submerging device having article receiving jaws which automatically open when the article is transferred to the emerging device, and the emerging device having jaws which yieldingly grip the article and automatically open when the article is moved therein by the transfer device.

15. In a metal coating machine, a receptacle for fluid coating material, apparatus for passing articles through the coating material in the receptacle and including an emerging device for raising the articles from the coating material, said device having jaws which receive the article, and means whereby said jaws are automatically opened to release the article and are caused to remain open for a predetermined interval.

16. In a metal coating machine, a receptacle for fluid coating material, apparatus for passing articles through the coating material in the receptacle and including an emerging device for raising the articles from the coating material, said device having jaws which receive the article, and means whereby said jaws are automatically opened to release the article and are subsequently automatically closed and moved to position to receive the next article.

17. In a coating machine, a receptacle for fluid coating material, apparatus for carrying articles through the coating material in the receptacle, and including a lifting device having yieldable jaws which receive, elevate and release the articles, means for shifting said jaws vertically, and means for causing the jaws to automatically spread at a predetermined point of the up stroke and to automatically move inward at a predetermined point of the down stroke.

18. In a coating machine, a receptacle for fluid coating material, apparatus for carrying articles through the material in the receptacle, including a device for elevating the articles from the material, said device including a pail holding member rotatably supported on the device, said member having bearings which automatically expand and contract on the occurrence of swell or wear caused by the fluid material.

19. In a coating machine, a receptacle for coating material, means for carrying articles through the material in the receptacle, means for receiving and conveying articles away from the receptacle, and means for automatically releasing the articles from said receiving and conveying means when a predetermined point is reached in the setting of the coating material on the articles.

20. In a coating machine, a receptacle for fluid coating material, apparatus for carrying articles through the coating material, apparatus for receiving and conveying away from the receptacle the coated articles, and means for causing said apparatus to automatically release the articles when carried for a predetermined time which is independent of the rate at which the articles are passed through the coating material.

21. In a coating machine, a receptacle for coating material, apparatus for carrying articles through the material in the receptacle, apparatus for receiving the coated articles and conveying them away from the receptacle, said last mentioned apparatus including a conveyer having article gripping members, and a trip device having means whereby it may be secured in adjusted position at different points along the conveyer, said trip device causing said article gripping members to release the articles at a predetermined point.

22. In a coating machine, a receptacle for fluid coating material, apparatus for conveying articles to be coated through the material in the receptacle, a carrier for receiving the coated articles and conveying them away from the receptacle, said carrier having means for turning the coated articles through definite angles during the carrying movement so as to drain excess fluid material from the articles.

23. In a coating machine, a receptacle for fluid coating material, apparatus for carrying articles to be coated throught the material in the receptacle, a carrier for conveying coated articles away from the receptacle, said carrier having spaced article gripping devices, and means for causing the said devices to turn the articles first to one position to drain material from a portion thereof, and subsequently to another position to drain material from other portions thereof.

24. In a coating machine, a receptacle for fluid coating material, apparatus for carrying articles to be coated throught the material in the receptacle, a carrier for conveying coated articles away from the receptacle, said carrier having spaced article gripping devices, means for causing the said devices to turn the articles first to one position to drain material from a portion thereof, and subsequently to another position to drain material from other portions thereof, and means for causing the automatic release of the articles when the latter have been conveyed in the last mentioned position for a predetermined time.

25. In a coating machine, a receptacle for fluid coating material, apparatus for passing articles down below the surface of the material and for subsequently elevating the articles through the surface, and means for cleaning the surface of the material before the articles pass outwardly therethrough, comprising a skimmer having relatively movable skimmer members by which the size of the skimmed surface may be varied.

26. In a coating machine, a receptacle for fluid coating material, apparatus for lowering articles into the coating material and for subsequently elevating them through the surface of the material, and a skimmer for skimming the surface of the material at the point where the articles emerge through said surface, said skimmer comprising relatively movable skimmer members, and means whereby the surface skimmed by said members is automatically adjusted in accordance with the size of the article passing through the coating material.

27. In a coating machine, a receptacle for fluid coating material, means for lowering articles to be coated into the material and subsequently elevating them through the surface of the material, and a skimmer for skimming the surface before the articles pass outwardly therethrough, said skimmer comprising a pair of coöperating pivoted skimmer blades having overlapping portions.

28. In a coating machine, a receptacle for fluid coating material, means for lowering articles to be coated into the material and subsequently elevating them through the surface of the material, and a skimmer for skimming the surface before the articles pass outwardly therethrough, said skimmer comprising a pair of coöperating pivoted skimmer blades, and means for automatically adjusting the spacing of said blades in accordance with the size of the article being handled by the apparatus specified.

29. In a coating machine, a receptacle for fluid coating material, means for lowering articles to be coated into the material and subsequently elevating them through the surface of the material, and a skimmer for skimming the surface before the articles pass outwardly therethrough, said skimmer comprising two pivoted levers, and skimmer blades each movably mounted on one of said levers and having portions which overlap, and means for causing said blades to pass in one direction above the surface of the material and in the opposite direction to swing through the material so as to clean the surface thereof.

30. In a coating machine, a receptacle for fluid coating material, apparatus for carrying articles through the material of the receptacle, apparatus for receiving the coated articles and for conveying them away from the receptacle and subsequently releasing said articles, and means for automatically removing the ragged edges of congealed coating material from the articles.

31. In a coating machine, a receptacle for fluid coating material, apparatus for conveying the articles through the material in the receptacle, a support on which the coated articles are adapted to be disposed, means for receiving the coated articles and conveying them toward, and then dropping them on the support, and means for moving the articles transversely from the surface of the said support.

32. In a coating machine, a receptacle for fluid coating material, apparatus for conveying the articles through the material in the receptacle, a support on which the coated articles are adapted to be disposed, means for receiving the coated articles and conveying them toward, and then dropping them on the support, and means for moving the articles laterally from the support and stacking them.

33. In a coating machine, a receptacle for fluid coating material, apparatus for conveying the articles through the material in the receptacle, a support on which the coated articles are adapted to be disposed, means for receiving the coated articles and conveying them toward, and then dropping them on the support, means for cooling the articles and means for moving them laterally from said support.

34. In a coating machine, a receptacle for fluid coating material, apparatus for conveying the articles through the material in the receptacle, a support on which the coated articles are adapted to be disposed, means for receiving the coated articles and conveying them toward, and then dropping them on the support, and means for cooling the articles, for shifting them laterally from said support, and stacking them.

In testimony whereof we hereunto affix our signatures.

JOSEPH MONTO.
ARTHUR R. CURTIS.